(12) United States Patent
Saiki et al.

(10) Patent No.: US 10,284,053 B2
(45) Date of Patent: May 7, 2019

(54) ELECTRIC MOTOR

(71) Applicant: KOBELCO CONSTRUCTION MACHINERY CO., LTD., Hiroshima-shi (JP)

(72) Inventors: Seiji Saiki, Hiroshima (JP); Hideki Yoshihara, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 169 days.

(21) Appl. No.: 15/120,640

(22) PCT Filed: Feb. 9, 2015

(86) PCT No.: PCT/JP2015/053559
§ 371 (c)(1),
(2) Date: Aug. 22, 2016

(87) PCT Pub. No.: WO2015/133229
PCT Pub. Date: Sep. 11, 2015

(65) Prior Publication Data
US 2017/0012502 A1      Jan. 12, 2017

(30) Foreign Application Priority Data

Mar. 3, 2014 (JP) ................................. 2014-040242

(51) Int. Cl.
*H02K 1/12* (2006.01)
*H02K 5/20* (2006.01)
(Continued)

(52) U.S. Cl.
CPC ................ *H02K 9/19* (2013.01); *H02K 1/12* (2013.01); *H02K 1/185* (2013.01); *H02K 5/20* (2013.01); *H02K 7/08* (2013.01)

(58) Field of Classification Search
CPC ............ H02K 9/19; H02K 1/12; H02K 1/185; H02K 5/20; H02K 7/08
(Continued)

(56) References Cited

U.S. PATENT DOCUMENTS 2,571,872 A * 10/1951 Hayes ...................... H02K 5/20
174/15.1
2,611,798 A * 9/1952 Hayes ...................... H02K 5/20
165/47
(Continued)

FOREIGN PATENT DOCUMENTS

JP       56-116876        9/1981
JP       2007-120510 A    5/2007
(Continued)

OTHER PUBLICATIONS

Extended European Search Report dated Mar. 23, 2017 in European Patent Application No. 15758183.6.
(Continued)

*Primary Examiner* — Bernard Rojas
*Assistant Examiner* — Ahmed Elnakib
(74) *Attorney, Agent, or Firm* — Oblon, McClelland, Maier & Neustadt, L.L.P.

(57) ABSTRACT

An electric motor includes a stator having an outer peripheral surface including a plurality of projections and a housing having an inner peripheral surface including a plurality of recesses and holding the stator in a state of respective fits of the projections with the recesses. The housing is internally formed with a cooling channel, which includes a plurality of main channels each formed in an inter-recess region defined between circumferentially adjacent recesses and a connection channel axially shifted from a recess and extending across the recess to connect main channels adja-
(Continued)

cent across the recess. The electric motor is capable of effectively cooling a stator without upsizing.

4 Claims, 9 Drawing Sheets

(51) Int. Cl.
    *H02K 7/20* (2006.01)
    *H02K 9/19* (2006.01)
    *H02K 7/08* (2006.01)
    *H02K 1/18* (2006.01)

(58) Field of Classification Search
    USPC ................................. 310/52, 54, 43, 57, 64
    See application file for complete search history.

(56) References Cited

U.S. PATENT DOCUMENTS

| | | | | |
|---|---|---|---|---|
| 3,371,613 | A * | 3/1968 | Dahlgren | F04D 29/586 310/54 |
| 6,300,693 | B1 * | 10/2001 | Poag | H02K 5/20 310/54 |
| 7,847,444 | B2 * | 12/2010 | Kingman | H02K 1/185 310/216.129 |
| 2002/0067086 | A1 * | 6/2002 | Kikuchi | H02K 1/148 310/54 |
| 2007/0013241 | A1 * | 1/2007 | Schiferl | H02K 1/32 310/54 |
| 2008/0185924 | A1 * | 8/2008 | Masoudipour | H02K 5/20 310/54 |
| 2009/0079278 | A1 * | 3/2009 | Kramer | H02K 5/20 310/54 |
| 2012/0153749 | A1 * | 6/2012 | Chun | H02K 1/185 310/59 |
| 2013/0106212 | A1 * | 5/2013 | Nakazumi | H02K 9/22 310/65 |
| 2017/0012502 | A1 * | 1/2017 | Saiki | H02K 5/20 |

FOREIGN PATENT DOCUMENTS

| | | |
|---|---|---|
| JP | 2007-143246 A | 6/2007 |
| JP | 2010-104130 A | 5/2010 |

OTHER PUBLICATIONS

International Search Report dated May 19, 2015 in PCT/JP2015/053559 Filed Feb. 9, 2015.

* cited by examiner

ELECTRIC MOTOR

TECHNICAL FIELD

The present invention relates to an electric motor including a rotor and a stator and having a function of cooling the stator.

BACKGROUND ART

As an electric motor having a cooling function, there are conventionally known one disclosed in Patent Literatures 1 and 2. An electric motor of this type includes a casing having a peripheral wall, which is internally formed with a cooling channel. The cooling channel allows a cooling medium such as water or oil to flow therein to thereby cool the casing.

It is important for an electric motor having such a cooling function to improve the cooling function, especially, a function of cooling a stator which generates heat, while restricting the structure of the electric motor from upsizing.

CITATION LIST

Patent Literature

Patent Literature 1: Japanese Unexamined Patent Publication No. 2007-120510

Patent Literature 2: Japanese Unexamined Patent Publication No. 2010-104130

SUMMARY OF INVENTION

It is an object of the present invention to provide an electric motor that includes a rotor and a stator for rotating the rotor, the electric motor being capable of effectively cooling the stator without a significant upsizing. The electric motor includes: a rotatable motor shaft; a rotor integrally rotatable with the motor shaft about an axis of the motor shaft; a stator arranged around the rotor to rotate the rotor; and a housing that accommodates the rotor and the stator and is internally formed with a cooling channel which allows refrigerant to flow in the cooling channel. The stator has an outer peripheral surface including a plurality of projections projecting radially outward at respective positions arranged circumferentially. The housing has an inner peripheral surface including a plurality of recesses fitted with the projections, respectively, and holds the stator in a state of respective fits of the projections with the recesses. The cooling channel includes a plurality of main channels that are formed in respective inter-recess regions defined between circumferentially adjacent recesses, and a connection channel located at a position axially shifted from a recess and crossing the recess to interconnect main channels adjacent across the recess.

DESCRIPTION OF EMBODIMENTS

Embodiments of the present invention will be described with reference to the accompanying drawings. Each of electric motors according to the embodiments is of a resin mold type that is installed in a vertical orientation so as to make a motor shaft extend vertically, such as a slewing motor of an excavator. The present invention is, however, not limited to this type.

FIGS. 1 to 4 show an electric motor according to a first embodiment of the present invention. The electric motor includes a rotatable motor shaft 21, a rotor 22 rotatable integrally with the motor shaft 21, a stator 23 disposed around the rotor 22 to rotate the rotor 22, a box-shaped housing body 24 which is open at the top thereof and accommodates the rotor 22 and the stator 23, and an end cover 25 attached to the housing body 24 to close the top opening of the housing body 24.

Figure 1:
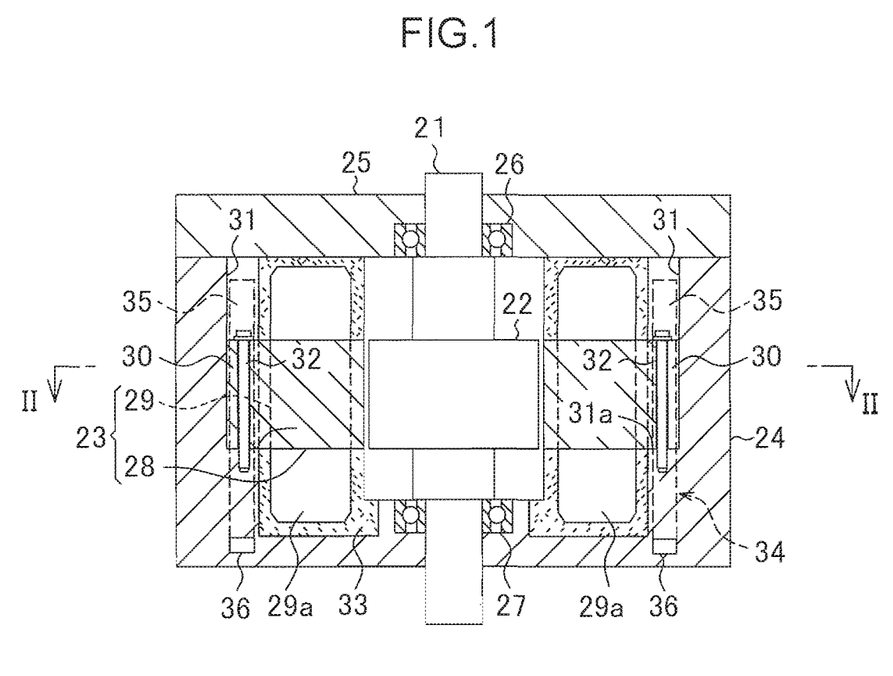
FIG. 1 is a sectional front view of an electric motor according to a first embodiment of the present invention.

In this embodiment, the housing body 24 and the end cover 25 constitute a housing that rotatably supports the motor shaft 21. The end cover 25 is fastened to the housing body 24 by a not-graphically-shown bolt at a position on an upper end surface of the housing body 24. The motor shaft 21 includes an upper portion rotatably supported on the end cover 25 via a bearing 26, and a lower portion rotatably supported on a lower portion of the housing body 24 via a bearing 27.

The stator 23 includes a stator core 28 and a stator coil 29. The stator core 28 is made of, for example, a plurality of magnetic steel sheets stacked on each other. The stator coil 29 is wound vertically around the stator core 28. The stator coil 29 has a pair of coil ends 29a which are upper and lower turn portions of the stator coil 29. The stator coil 29 is wound such that the pair of coil ends 29 project beyond upper and lower end surfaces of the stator core 28 axially of the electric motor.

Figure 2:
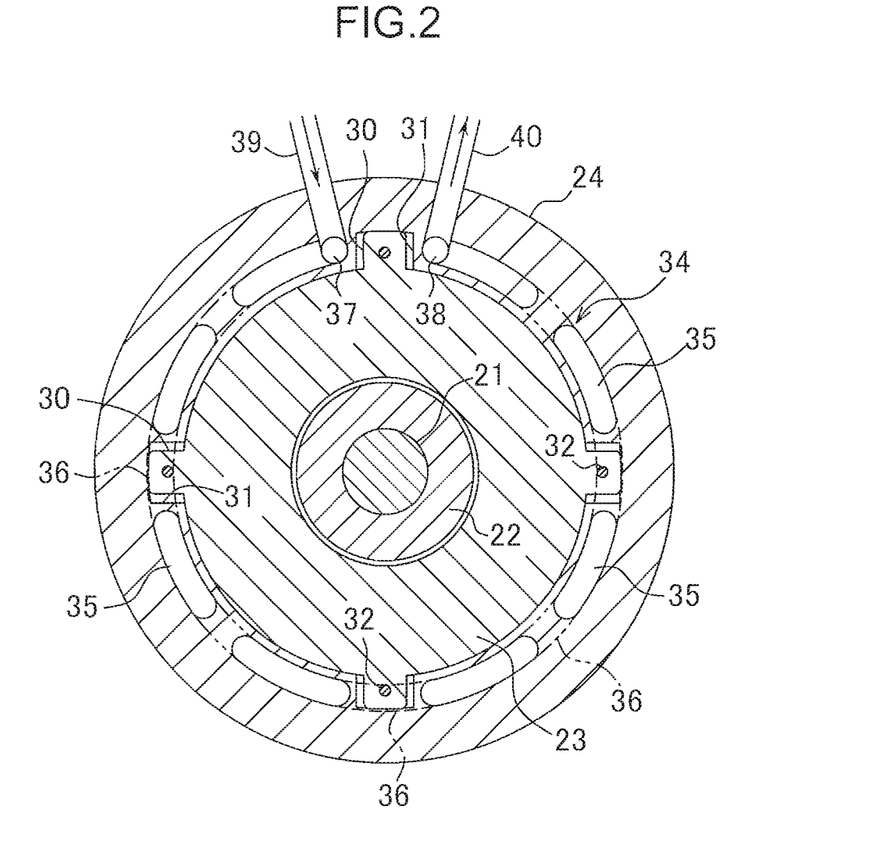
FIG. 2 is a sectional view taken along the line II-II in FIG. 1.

The housing body 24 holds the stator 23 while being fitted with the stator 23. The stator core 28 of the stator 23 has an outer peripheral surface including a plurality of projections 30, while the housing body 24 has an inner peripheral surface including a plurality of recesses 31 capable of fit with respective projections 30. The stator 23 is attached to the housing body 24, involving respective fits of the projections 30 with the recesses 31.

The plurality of projections 30 are formed at respective positions, in this embodiment, at four positions circumferentially spaced 90 degrees apart on the outer peripheral surface of the stator core 28. Each of the projections 30 projects radially outward beyond the other portion and extends vertically over the entire stator core 28.

The plurality of recesses 31 are formed in the housing body 24 at respective positions corresponding to the projections 30, in this embodiment, at respective four positions spaced 90 degrees apart. Each of the recesses 31 is recessed radially inward beyond the other portion and extends vertically so as to be capable of receiving a corresponding projection 30. In other words, the recess 31 has a width, a depth, and a length that are sufficient for receiving the entire projection 30. The recess 31 is in the form of a groove having an opening at the top and a lower end closed by a bottom surface 31a. The projection 30 is fitted into the recess 31 so as to come into contact with the bottom surface 31a to be supported thereon, and secured to the housing body 24 by a bolt 32 passing through the projection 30 vertically.

The electric motor further includes filling material 33. The filling material 33 includes a material having both an insulating property and a thermal conductivity, such as a synthetic resin material, for example, unsaturated polyester. The filling material 33 is molded in such a way as to surround the stator 23, thereby promoting heat transfer from the stator 23 to the housing body 24 and the end cover 25.

The housing body 24 is internally formed with a cooling channel 34 for cooling the stator 23 and other components. The cooling channel 34 allows refrigerant such as water to circulate therein to thereby promote cooling of the stator 23 and other components.

Figure 3:
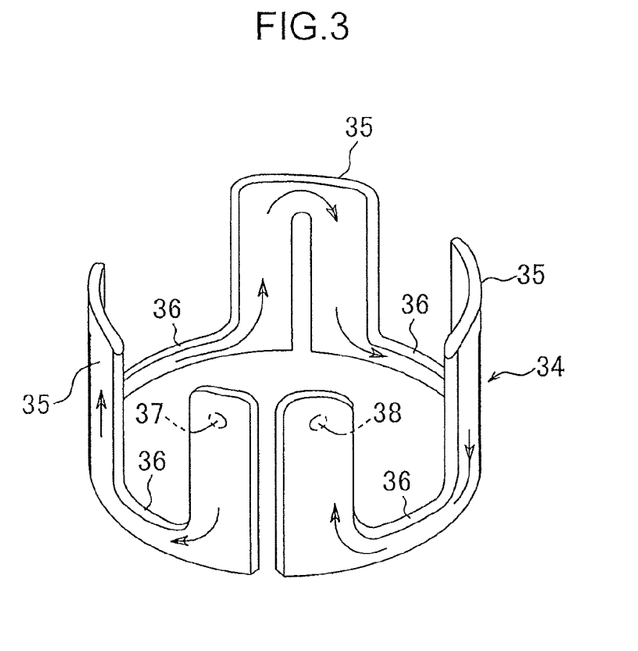
FIG. 3 is a perspective view of a cooling channel of the electric motor shown in FIG. 1.
Figure 4:
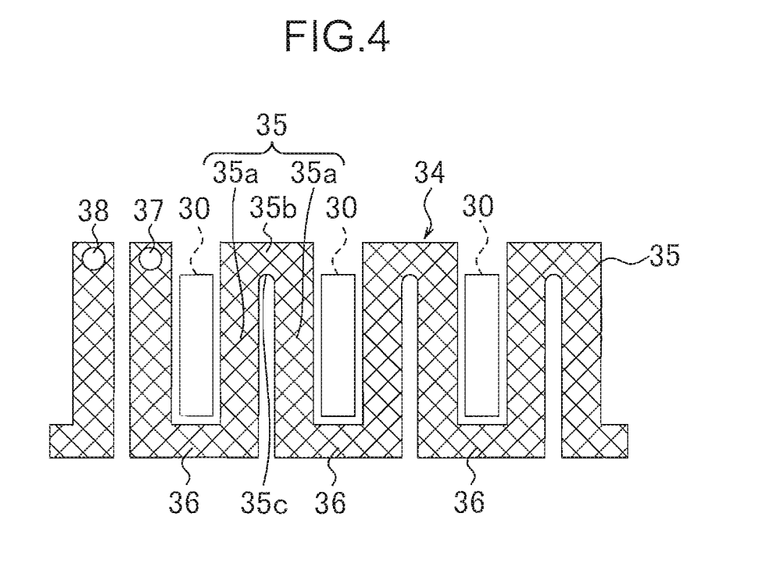
FIG. 4 is a developed view of the cooling channel shown in FIG. 3.

The cooling channel 34 includes a plurality of main channels 35 and a plurality of connection channels 36.

Each of the plurality of main channels 35 is formed in an inter-recess region of the housing body 24 defined between circumferentially adjacent recesses 31, and extends circumferentially at a location where at least a part of the main channel 35 overlaps a recess 31 when seen circumferentially. Each of the plurality of connection channels 36 is located at a position shifted from a recess 31 axially of the electric motor and extends circumferentially across the recess 31 such that at least a part of the connection channel 36 overlaps the recess 31 when seen axially of the electric motor, to interconnect main channels 35 adjacent across the recess 31. The widthwise center of each of the channels 35 and 36 (the center in a direction corresponding to the radial direction of the housing body 24) may be located in a circle through the center of each recess 31, or may be shifted slightly outward from the circle radially of the housing body 24 but with a part of the channel 35 or 36 lying within the circle.

FIGS. 3 and 4 are a perspective view and a developed view of the cooling channel 34, respectively. In FIG. 4, the cooling channel 34 is shown in mesh in order to facilitate understanding of the shape of the cooling channel 34. The same applies to FIGS. 5 and 7.

Each main channel 35 includes a pair of axial portions 35a and a return portion 35b. The pair of axial portions 35a extend axially of the electric motor, i.e., vertically, and are spaced circumferentially in the inter-recess region. The return portion 35b extends circumferentially, i.e., right-left direction in FIG. 4, so as to interconnect respective one ends, in this embodiment, respective upper ends of opposite ends of the axial portions 35a. Each connection channel 36 interconnects respective other ends of opposite ends of adjacent axial portions 35a belonging to circumferentially adjacent main channels 35, respectively, the other ends being opposite to the return portions 35b. Specifically, each of the connection channels 36, in this embodiment, lies under a projection 30 and a recess 31 and extends circumferentially to interconnect a lower end of a downstream axial portion 35a that belongs to an upstream main channel 35 and a lower end of an upstream axial portion 35a that belongs to a downstream main channel 35 of adjacent main channels 35. Thus, the cooling channel 34 has a shape meandering so as to return at upper and lower portions alternately and being continuous circumferentially of the housing.

Each of the connection channel 36 includes a refrigerant inlet 37 and a refrigerant outlet 38, as shown in FIG. 2. The refrigerant inlet 37 and the refrigerant outlet 38 are located on both sides of a particular recess 31. A refrigerant inlet tube 39 is connected to the refrigerant inlet 37 and a refrigerant outlet tube 40 is connected to the refrigerant outlet 38.

The cooling channel 34, thus including the plurality of main channels 35 formed in the respective inter-recess regions and the plurality of connection channels 36 each disposed at a position shifted from a recess 31 axially of the electric motor and extending across the recess 31 to interconnect adjacent main channels 35, can be formed on radially inside of the housing body 24, i.e., on a side closer to the stator 23. Specifically, with respect to a radial direction of the electric motor, the most inner end of the cooling channel 34 can be located inside the outer ends of the recesses 31. The thus arranged cooling channel 34 allows refrigerant to efficiently absorb heat of the stator 23, i.e., the stator core 28 and the stator coil 29 including the coil ends 29a, where the greatest amount of heat is generated, through the filling material 33, thereby enabling the cooling performance of the entire electric motor to be remarkably improved.

Figure 8:
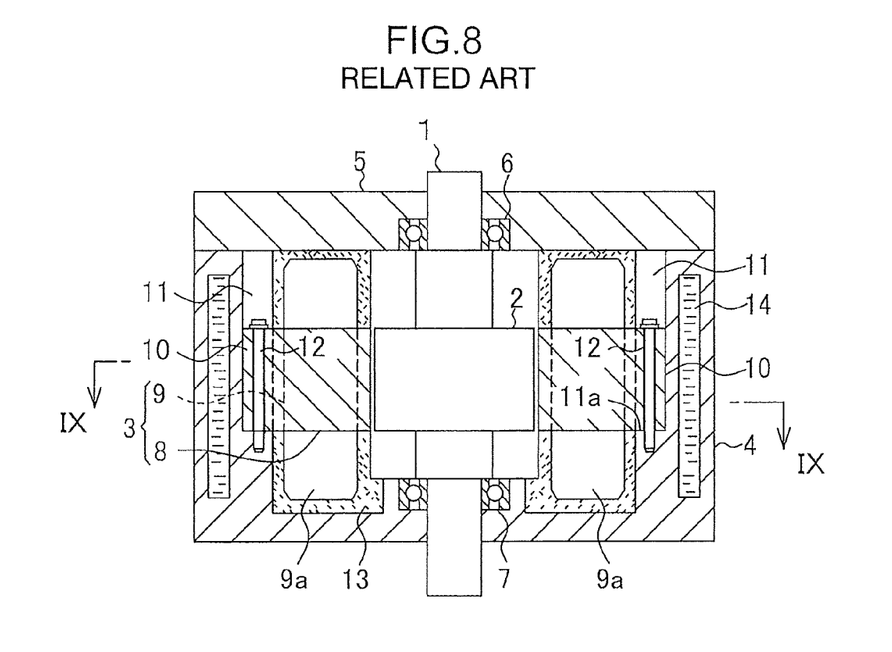
FIG. 8 is a sectional front view of an electric motor according to a reference example for explaining the present invention.
Figure 9:
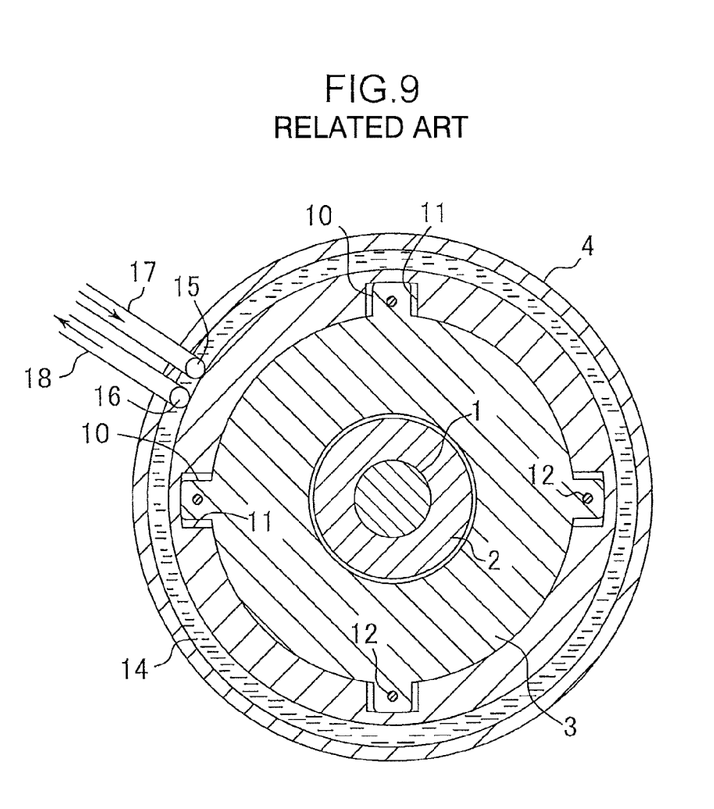
FIG. 9 is a sectional view taken along the line IX-IX in FIG. 8.

This advantageous effect will be described in comparison with a comparative example shown in FIGS. 8 and 9. An electric motor according to the comparative example includes, similarly to the electric motor of the first embodiment, a motor shaft 1 rotatably supported by bearings 6 and 7, a rotor 2 rotatable integrally with the motor shaft 1, a stator 3 including a stator core 8 and a stator coil 9 and operable to rotate the rotor 2, a housing body 4 holding the stator 3, and an end cover 5 attached to the housing body 4 to constitute a housing with the housing body 4. As in the first embodiment, the stator 3 has an outer peripheral surface including a plurality of projections 10, while the housing body 4 has an inner peripheral surface including a plurality of recesses 11 capable of fit with the projections 10, the stator 3 being secured to the housing body 4 by bolts 12 with respective fits of the projections 10 and the recesses 11. Furthermore, the housing 4 is formed with a cooling channel 14 including a refrigerant inlet 15 and a refrigerant outlet 16, which are connected to a refrigerant supply tube 17 and a refrigerant discharge tube 18, respectively.

The cooling channel 14 of the electric motor according to the comparative example, differently from the cooling channel 24 of the first embodiment, has a cylindrical shape enclosing the stator 3 and the recesses 11, similarly to common cooling channels. The thus shaped cooling channel 14 cannot be disposed but at a position radially outside the recesses 11, which makes the radial distance between the cooling channel 14 and the stator 3 be inevitably greater than the radial distance between the cooling channel 34 and the stator 23 in the first embodiment. This difference in the distance provides a great difference in the cooling performance to the cooling channel 34. Besides, forming the cooling channel 34 radially outside the recesses 11 involves an increase in the diameter of the housing 4. Furthermore, expanding the cooling channel 14 diametrically or axially of the stator 3 to ensure high cooling performance involves further increase in the diameter or the axial length of the entire electric motor.

In contrast to the electric motor of the comparative example, the electric motor according to the first embodiment, i.e., the electric motor including the cooling channel 34 having the plurality of main channels 35 and the plurality of connection channels 36, which allows the cooling channel 34 to be formed at the position where at least a part of the cooling channel 34 overlaps each recess radially, can achieve high cooling performance without increasing the diameter of the housing 4 and expanding the cooling channel 34 diametrically and axially of the housing 4.

Furthermore, according to the electric motor shown in FIG. 1, it is also possible to form each of the connection channels 36 at a position obliquely below and near the lower coil end 29a, which allows the cooling effect on the lower coil end 29a to be further enhanced.

Moreover, the cooling channel 34 according to the first embodiment, having the overall shape meandering vertically, restricts a flow disturbance such as non-uniform flow or stagnation of refrigerant from occurring in a specific portion, usually in a lower portion, as compared to, for example, the case where a main channel 35 disposed in each inter-recess region is simply cylindrical and respective lower ends of adjacent main channels 35 are interconnected through a connection channel 36. This makes it possible to uniformly cool the entire outer peripheral surface of the stator 23 to thereby further improve the cooling efficiency.

The lower end surface 35c, i.e., an inner surface axially of the electric motor, of each of the return portions 35b is preferably curved outward axially (in this embodiment, upward), that is, shaped to allow smooth flow of refrigerant. This allows refrigerant to flow smoothly in the return portions. In addition, this shape provides an advantageous effect of facilitating, in the case of forming the housing body 24 including the cooling channel by molding, ensuring the strength of a core used for forming the main channels 35 in the meandering shape to thereby prevent cracks or the like from occurring during the manufacture.

The shape of the cooling channel according to the present invention may be modified in various ways.

Figure 5:
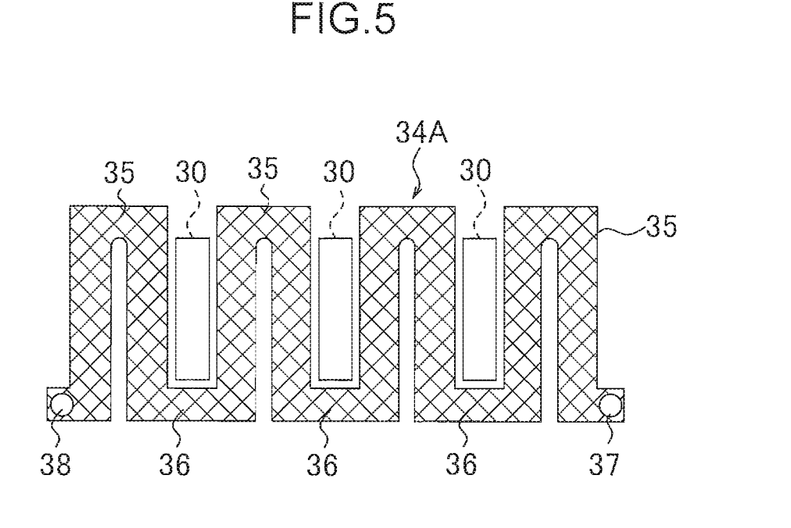
FIG. 5 is a developed view of a cooling channel according to a second embodiment of the present invention.

FIG. 5 shows a cooling channel 34A according to a second embodiment of the present invention. While the refrigerant inlet 37 and the refrigerant outlet 38 in the cooling channel 34 according to the first embodiment are formed in the two adjacent main channels 35 and 35, respectively, as shown in FIGS. 2 to 4, the cooling channel 34A shown in FIG. 5 has a particular connection channel 36 which is divided at the center, each of the divided halves being provided with a refrigerant inlet 37 and a refrigerant outlet 38.

Figure 6:
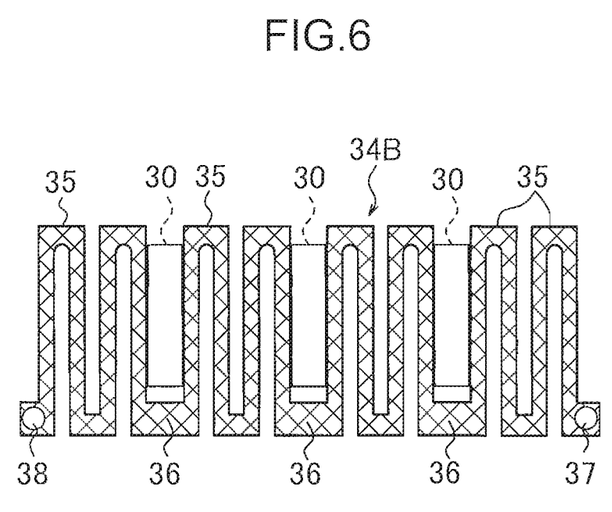
FIG. 6 is a developed view of a cooling channel according to a third embodiment of the present invention.

FIG. 6 shows a cooling channel 34B according to a third embodiment. The cooling channel 34B is in the form of a pipe having a meandering shape and casted in the housing body 24. A refrigerant inlet 37 and a refrigerant outlet 38 are formed in opposite ends of the pipe, respectively. The refrigerant inlet 37 and refrigerant outlet 38 may be disposed in a connection channel 36 as shown in FIG. 6, or may be disposed in main channels 35 as in the first embodiment.

Figure 7:
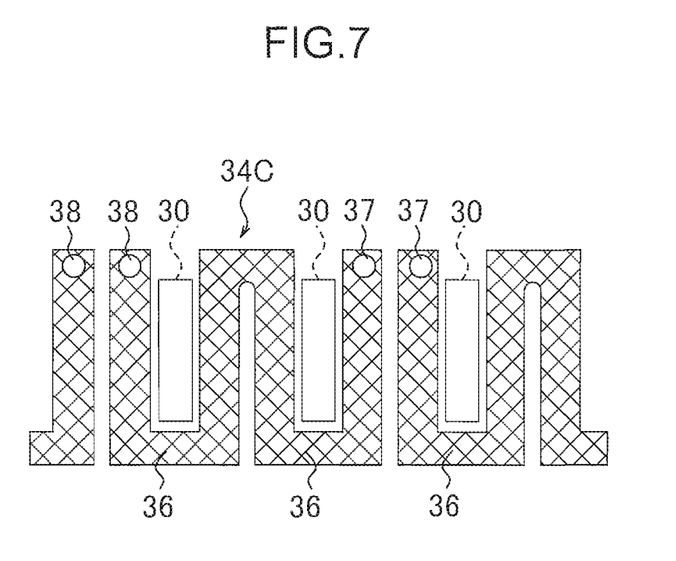
FIG. 7 is a developed view of a cooling channel according to a fourth embodiment of the present invention.

FIG. 7 shows a cooling channel 34C according to a fourth embodiment. The cooling channel 34C is divided into a plurality of portions (two portions in FIG. 7) and each of the divided portions is provided with a refrigerant inlet 37 and a refrigerant outlet 38. Also this case allows the refrigerant inlet 37 and the refrigerant outlet 38 to be disposed either in main channels 35 or a connection channel 36 of each of the divided portions.

According to the present invention, the arrangement and number of the projections of the stator and the recesses of the housing are not limited. For example, the projections and the recesses may be disposed at two, three, five or more positions circumferentially arranged. Further, they do not have to be uniformly spaced circumferentially.

The electric motor according to the present invention is not limited to the type vertically disposed; for example, it may be of a type disposed in a horizontal orientation so as to make a motor shaft extend horizontally. Besides, the invention is not limited to an electric motor in which filling material is molded. Furthermore, the present invention is also applicable to generators and generator motors including a rotor and a stator in the same manner as described.

As described above, according to the present invention, provided is an electric motor that includes a rotor and a stator for rotating the rotor, the electric motor being capable of effectively cooling the stator without a significant upsizing. The electric motor includes: a rotatable motor shaft; a rotor integrally rotatable with the motor shaft about an axis of the motor shaft; a stator arranged around the rotor to rotate the rotor; and a housing that accommodates the rotor and the stator and is internally formed with a cooling channel which allows refrigerant to flow in the cooling channel. The stator has an outer peripheral surface including a plurality of projections projecting radially outward at respective positions arranged circumferentially. The housing has an inner peripheral surface including a plurality of recesses fitted with the projections, respectively, and holds the stator in a state of respective fits of the projections with the recesses. The cooling channel includes a plurality of main channels that are formed in respective inter-recess regions defined between circumferentially adjacent recesses, and a connection channel located at a position axially shifted from a recess and crossing the recess to interconnect main channels adjacent across the recess.

The cooling channel, which includes the combination of the plurality of main channels each formed in the inter-recess region and the connection channels each disposed at a position axially shifted from a recess and extending across the recess to interconnect adjacent main channels, can be formed at a position where an inner end of the cooling channel lies radially inside, i.e., closer to the stator than, outer ends of the recesses. This makes it possible to improve the performance of the cooling channel of cooling the stator without a significant increase in the diameter and axial dimension of the housing.

As to a specific shape of the cooling channel, it is preferred that each of the main channels includes a pair of axial portions spaced circumferentially of the housing and extending axially of the electric motor, and a return portion interconnecting respective one ends of opposite ends of the pair of axial portions, and that the connection channel interconnects respective other ends of opposite ends of adjacent axial portions belonging to circumferentially adjacent main channels, the other ends being opposite to the return portion, so as to make the entire cooling channel have a shape meandering in a direction parallel to an axial direction of the electric motor.

The cooling channel thus having such meandering shape restricts a flow disturbance such as non-uniform flow, in which refrigerant concentratedly flows to a specific portion (especially a lower portion), or stagnation from occurring. This makes it possible to promote uniform cooling of the outer peripheral surface of the stator to thereby further improve the cooling efficiency.

In this case, the return portion of the main channel is preferred to have an axially inner surface curved axially outward. This shape allows smooth flow of refrigerant at the return portion, that is, returning thereof. Besides, it is possible to facilitate, in the case of forming the housing including the cooling channel by molding, ensuring the strength of a core used for defining the cooling channel to thereby prevent cracks or the like from occurring during the manufacture.

The invention claimed is:

1. An electric motor, comprising:
a rotatable motor shaft;
a rotor rotatable integrally with the motor shaft about an axis of the motor shaft;
a stator arranged around the rotor to rotate the rotor;
a box-shaped housing body which is open at the top thereof and accommodates the rotor and the stator; and
an end cover attached to the housing body to close the top opening of the housing body, where the housing body and the end cover constitute a housing that rotatably supports the motor shaft, wherein
the housing body is internally formed with a cooling channel which allows refrigerant to flow therein, wherein:
the stator has an outer peripheral surface including a plurality of projections projecting radially outward at respective positions arranged circumferentially;
the housing body has an inner peripheral surface including a plurality of recesses fitted with the projections, respectively, and holds the stator in a state of respective fits of the projections with the recesses, each of the recesses having an opened end covered by the end cover and a closed end opposite to the opened end and the end cover axially of the electric motor; and
the cooling channel includes a plurality of main channels that are shorter than an axial length of the housing body and are formed in respective inter-recess regions defined between circumferentially adjacent recesses, and a connection channel located in the housing body at a position axially shifted from a recess and crossing the recess to interconnect main channels adjacent across the recess,
wherein the housing body is internally formed with the cooling channel including the main channels and the connection channel, and
wherein each of the plurality of connection channels is located at a position apart from the closed end of each of the recesses axially of the electric motor on an opposite side to the end cover axially of the electric motor and extends circumferentially across the recess such that at least a part of the connection channel overlaps the recess when seen axially of the electric motor.

2. An electric motor according to claim 1, wherein: each of the main channels of the cooling channel includes a pair of axial portions spaced circumferentially of the housing and extending axially of the electric motor, and a return portion interconnecting respective one ends of opposite ends of the pair of axial portions; and the connection channel interconnects respective other ends of opposite ends of adjacent axial portions belonging to circumferentially adjacent main channels, the other ends being opposite to the return portion, so as to make the entire cooling channel have a shape meandering in a direction parallel to an axial direction of the electric motor.

3. An electric motor according to claim 2, wherein the return portion of the main channel has an axially inner surface curved axially outward.

4. An electric motor according to claim 1, wherein the connection channel has an inlet and an outlet extending in a radial direction and connected to a respective one of the main channels.

* * * * *